United States Patent [19] Vamvakas

[11] 4,199,049

[45] Apr. 22, 1980

[54] BOTTLE UNSCRAMBLER AND LOADER

[75] Inventor: Michael Vamvakas, Rocky River, Ohio

[73] Assignee: Niagara Bottle Washer Manufacturing Co., Cleveland, Ohio

[21] Appl. No.: 918,338

[22] Filed: Jun. 23, 1978

[51] Int. Cl.$^2$ .............................................. B65G 29/02

[52] U.S. Cl. .................................... 198/408; 198/480; 198/631; 198/647; 198/803

[58] Field of Search ............... 198/408, 480, 481, 419, 198/631, 441, 436, 432, 482, 803, 647, 412, 434, 407

[56] References Cited

U.S. PATENT DOCUMENTS

| | | | |
|---|---|---|---|
| 3,121,489 | 2/1964 | Meyer et al. | 198/480 X |
| 3,724,639 | 4/1973 | Hara | 198/434 X |
| 4,122,937 | 10/1978 | Vischer et al. | 198/408 |

*Primary Examiner*—Robert B. Reeves
*Assistant Examiner*—Douglas D. Watts
*Attorney, Agent, or Firm*—Baldwin, Egan, Walling & Fetzer

[57] ABSTRACT

An apparatus is disclosed for unscrambling a mass of uniform size bottles and loading the same in rather large groups into a continuously moving conveyor on which are arranged a series of bottle receptacles arranged in a double row including a first or upper row of a plurality of closely spaced receptacles, and a second or lower row of receptacles of the same number as the first row but offset to one side from the receptacles of the first row by an amount equal to half the spacing of the first row receptacles. The apparatus includes a rotary transporting device having a plurality of rigidly connected transporting wheel structures equal in number to the number of bottle receptacles in a row, each of these wheel structures having one set of two bottle carrier recesses opening radially outwardly and specifically spaced circumferentially so that the rotation of the wheel structure timed to the drive of the transporting mechanism will bring a first of the bottle carrier recesses opposite a first row receptacle on the transporting mechanism, and will bring the second of the bottle carrier recesses opposite a second row receptacle on the transporting mechanism.

5 Claims, 4 Drawing Figures

BOTTLE UNSCRAMBLER AND LOADER

An object of the present invention is to arrange a rather simple device for handling a large number of uniform size bottles on a feeding or accumulator table so as to pass them through individually in a plurality of single parallel lines to a receiving and transposing mechanism located at one side of the table. The transposing mechanism includes a plurality of rigidly mounted helicoidal rings on a rotating wheel structure so as to move a first row of bottles received from the feeding table into a first or top row of receptacles on a movable transporting conveyor at the other side of the receiving and transposing mechanism, and to move a second row of bottles presented at the edge of the feeding table by one-half the spacing of the bottles in the first row of receptacles, so as to present the second row of bottles to a second row of receptacles on the transporting mechanism which are offset in one direction from the first row by half of the spacing of the first row. Thus, a number of bottles may be collected on the feeding table in a smaller space than is customary in this type of apparatus and a large number of these bottles may be eventually deposited in a transporting conveyor in a closer arrangement of bottles than has heretofore been thought to be possible.

Other objects and advantages of the present invention will be apparent from the accompanying drawings and description and the essential features will be set forth in the appended claims.

BRIEF DESCRIPTION OF THE DRAWINGS

FIG. 3 is a sectional view taken along the lines 3—3 of FIG. 1; while

DESCRIPTION OF PREFERRED EMBODIMENTS

Figure 1:
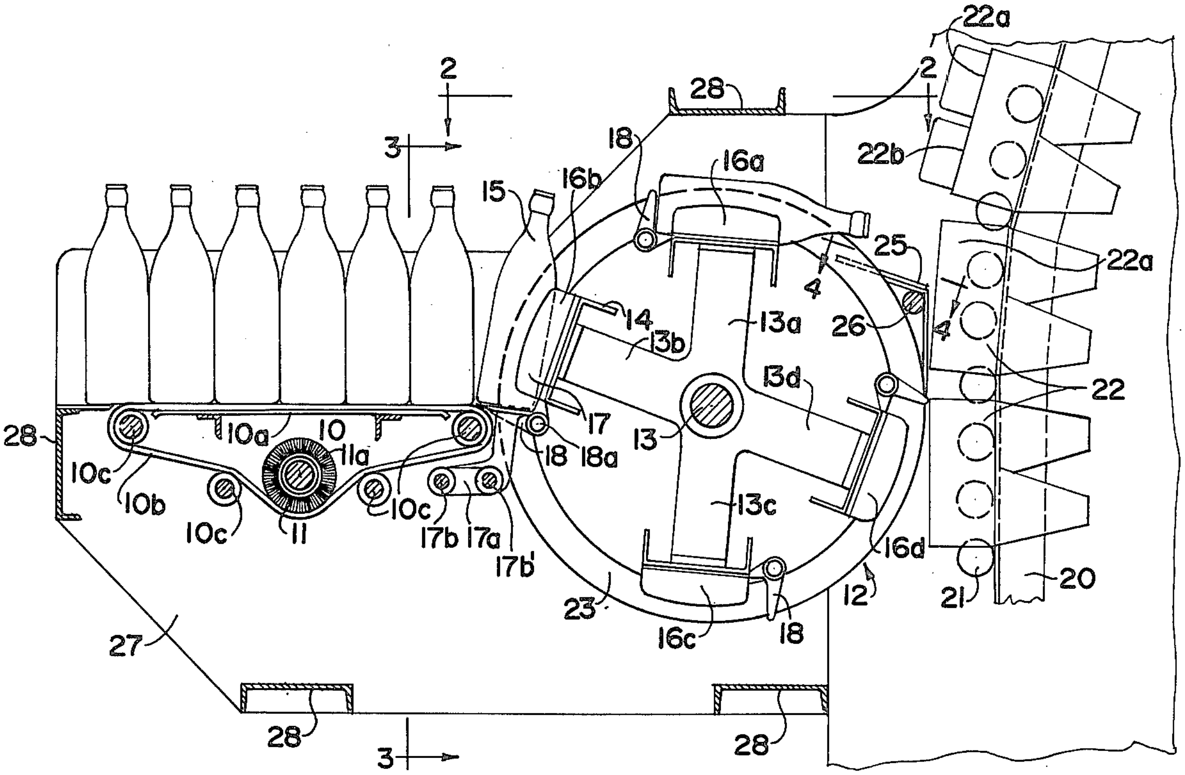
FIG. 1 is an elevational view taken from the end of one row of bottles presented to the receiving and transposing mechanism.

As seen in FIG. 1, the feeding or accumulating table 10 comprises a flat plate 10*a* over which passes an endless wire mesh conveyor belt 10*b* which is supported on rollers 10*c*. Means is provided for moving the belt resiliently in the direction of the arrow shown in FIG. 1. Here shown is a driving roll 11 which is a brush having radially extending wire bristles 11*a* which drive the belt 10*b* but which allows a slippage between the drive roll and the belt when the bottles are held up on their passage across the feeding table. The bottles are empty and of uniform size and collect upon the feeding table in a heterogeneous arrangement as is represented by the eleven bottles shown on the lowest row seen in FIG. 2.

Figure 2:
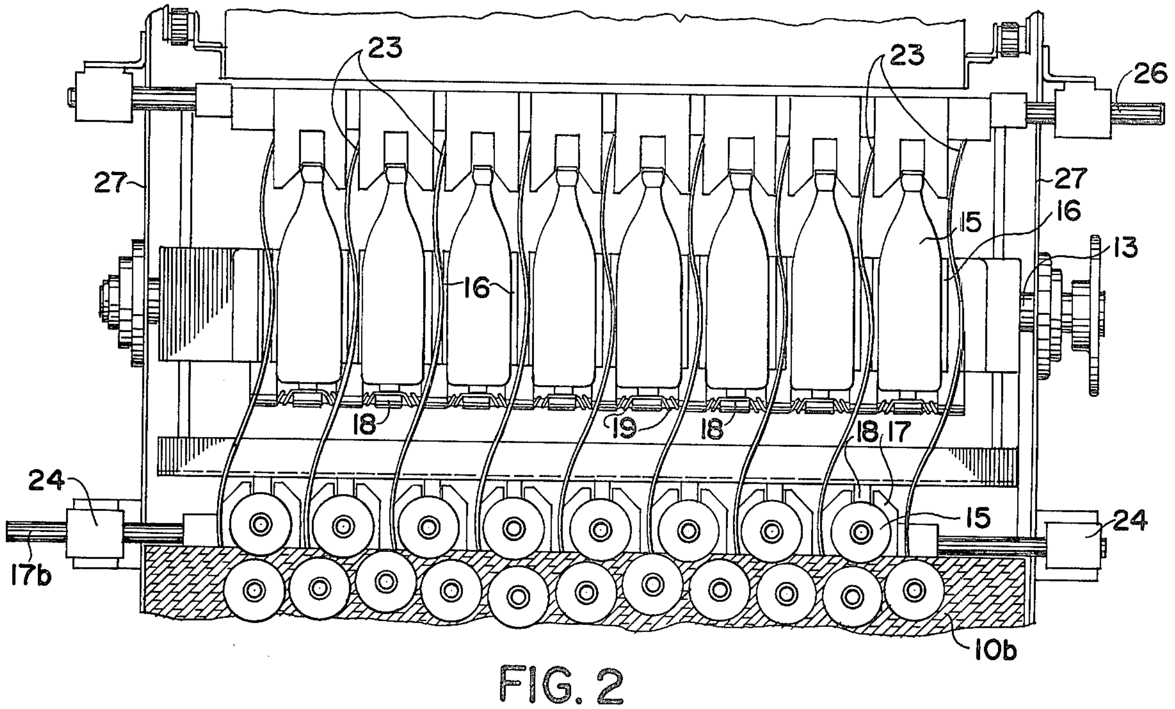
FIG. 2 is a partial top plan view taken along the line 2—2 of FIG. 1.

The receiving and transporting mechanism shown at 12, includes a wheel structure having a central rotatable shaft 13 from which extend four arms, 13*a* and 13*b* which will be described together, and 13*c* and 13*d* which provides a repetition of the pair of arms 13*a* and 13*b*. These arms carry at their outer ends rigidly attached channels 14 which extend the full length of the row of bottles indicated by the first bottle in the row shown at 15. There are eight bottles in a row handled at one time in this description although it will be understood that the invention may be applied to any number of bottles which can be handled at one time in the row. Each wheel arm carries a bottle carrier recess 16 which opens outwardly and which is curved to fit the outside cylindrical surface of the bottle to be carried. As each bottle in the row of eight bottles comes to the pick-up position at the righthand side of the feeding table 10, as seen in FIG. 1, it strikes a bottle stop 17 which is rigidly fixed by its downwardly extending bracket 17*a* which is secured at point 17*b* and pivoted at 17*b'*. This stops each bottle in a position leaning slightly forward as seen in FIG. 1 at 15. A bottle lifting arm 18 is pivotally mounted at the downstream edge of each of the bottle carrier recesses 16 in position to pick up a bottle from the feeding table at each rotation of the wheel structure. As best seen in FIG. 2, the lifting finger 18 passes through a suitable opening in the stop member 17. Each lifting finger 18 is spring presssed by a helical spring structure like that shown at 19 in FIGS. 2 and 4 so that if a bottle being carried by the lift finger strikes an obstruction, then the finger can give in a backward direction without causing any damage to the machinery.

Figure 3:
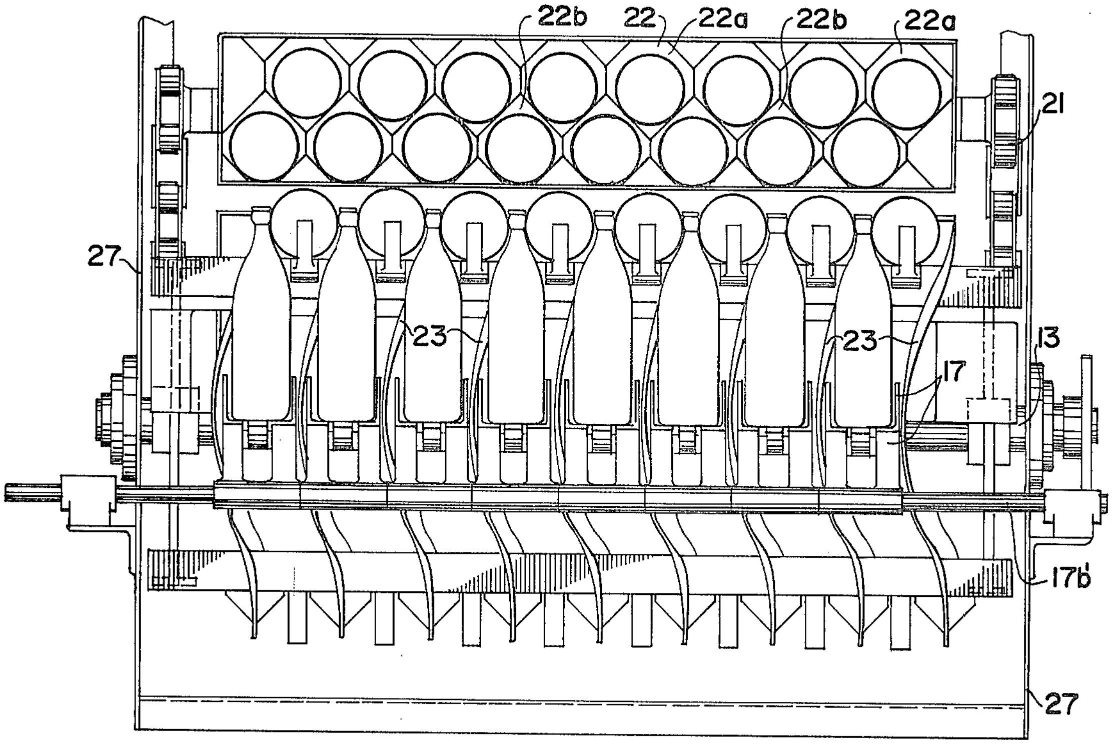

The unscrambling apparatus about to be described is designed particularly to load the bottles into a transportation conveyor 20 located at the righthand side of the receiving and transposing mechanism shown in FIG. 1. This comprises parallel transporting chains 21 which carry a series of double row receptacle structures as shown in FIG. 3 at 22. This comprises a plurality, in this case eight, of first row receptacles 22*a* which are each of a size to receive a single bottle and which are spaced on parallel axes very closely together as seen in FIG. 3. Each of these groups 22 includes a second row of bottle receptacles 22*b*, being the same number as in row 22*a* and spaced evenly like the first row, offset to one side, as to the left as seen in FIG. 3 by half the spacing of the first row of receptacles. This arrangement provides a very compact structure for the sixteen bottles shown at the upper edge of FIG. 3.

It will now be apparent that a batch of bottles to be handled by this invention start out in a straight line as seen in FIGS. 2 and 3 and are then transferred by this invention into one row of a two-row receptacle 22 as seen in FIGS. 1 and 3. The two rows in each receptacle are offset as clearly shown in FIG. 3. The bottles are carried by a wheel structure comprising the arms 13*a* and 13*b*, 13*c* and 13*d*; these are all in a single general plane as they pass around the wheel structure. A novel arrangement is supplied to distribute the bottles, received in a single row, so as to deposit them in two rows 22*a*, 22*b* as described herein.

This novel structure comprises a plurality of helicoidal rings 23 rigidly mounted on the wheel structure driven by shaft 13. There is one of these helicoidal rings on each side of each bottle intended for a first row receptacle 22*a* and each of these rings extends in a smooth curve to the side of each bottle intended for the offset second row receptacles 22*b* during the rotation of the wheel structure through a specifically spaced circumference. Referring to the righthand side of FIG. 1, it will be noted that the spacing between receptacles 22*a* and 22*b* of a single double receptacle group 22 is less than the distance between the row 22*b* of a first receptacle group and the row 22*a* of the first row in the next receptacle group as seen in FIG. 1. Therefore, the rotating wheel structure driven by shafts 13 is provided with arms 13*a* and 13*b* spaced in this embodiment at 75° circumferentially while the spacing between arm 13*b* and 13c is 105°. The timing of the driven conveyor 20 is so arranged with respect to the rate of rotation of the drive shaft 13 that a first carrier recess 16a will deliver its bottle directly into the upper row 22a of one of the group receptacles while the next carrier recess 16b will deliver its bottle to the second row 22b of the same character group, as shown in FIG. 1. Arm 13c is 105° from arm 13b so as to allow the extra time between sets 22. Referring to FIG. 2, it will be seen that all of the row of bottles ready to be handled by this machine at position 15 are standing each in its bottle stop 17 and these bottle stops are all carried on a common shaft 17b' which is supported at opposite ends in a rather loose bearing structure 24. Thus, upon rotation of a helicoidal ring 23, all of the bottle stop members 17 oscillate back and forth right and left together as seen in FIG. 2.

Figure 4:
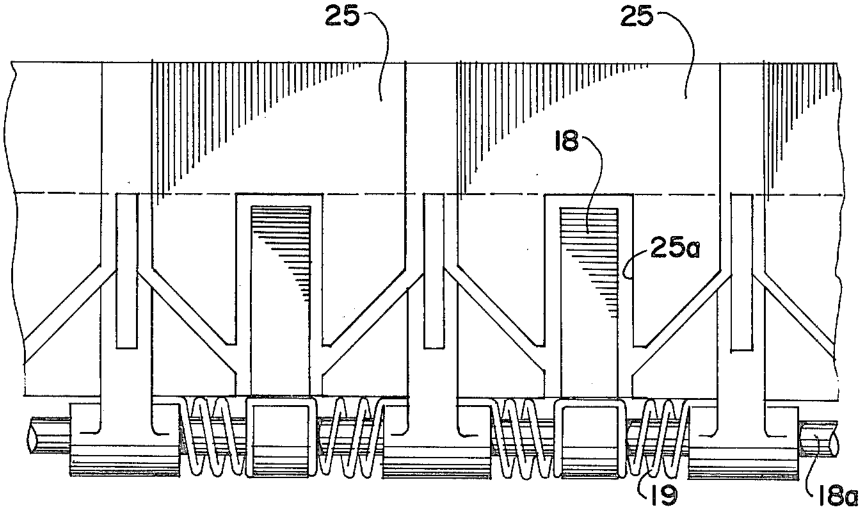
FIG. 4 is an enlarged partial view taken along the line 4—4 of FIG. 1.

Referring to FIG. 1, where a bottle is transferred from the rotary wheel structure to the receptacle group on the transporting conveyor 20, a bottle resting plate 25 is provided which is best seen in FIGS. 1 and 4. One of these plates is provided for each row of bottles coming through the rotary wheel structure. Each plate has a recess 25a through which the finger 18 may pass and the plate 25 is tangent to the rotary wheel structure at the point where the bottle would first tend to slide off the wheel circle into the waiting receptacle. All of the bottle resting plates 25 are mounted on a common shaft 26.

All of the parts described herein except the transporting conveyor 20 and the receptacle groups 22 are mounted between parallel side plates 27 which in turn are rigidly connected together by cross beams 28.

It will be noted that, in this invention, each bottle is moved from the feeding table to the resting plate with any relative movement between the bottle and the transposing elements.

What is claimed is:

1. A uniform size bottle unscrambler and loader comprising a feeding table, a bottle receiving and transposing mechanism at one side of said table, means urging a collection of bottles, upended on said table, toward said mechanism, a bottle transporting mechanism downstream from said receiving and transposing mechanism including a series of a plurality of a predetermined number of closely-spaced bottle receptacles rigidly secured in two parallel rows, all of said receptacles being on parallel axes and each of a size to receive a single bottle, the receptacles of the second row being evenly offset to one side from the receptacles of the first row by half the spacing of said first row of receptacles, said receptacles all opening in a common plane toward said receiving and transposing mechanism, said receiving and transporting mechanism including a rotary transporting device having a plurality of rigidly connected transporting wheel structures equal in number to said predetermined number of bottle receptacles, each wheel structure having at least one set of two bottle carrier recesses opening radially outwardly and specifically spaced circumferentially so that the rotation of said wheel structure relative to the drive of said transporting mechanism will bring a first of said bottle carrier recesses opposite a first row receptacle on said transporting mechanism and bring the second of said bottle carrier recesses opposite a second row receptacle on said transporting mechanism, a bottle lifting arm mounted at the downstream edge of each of said bottle carrier recesses in position to pick up a bottle from said feeding table at each rotation of said wheel structure, a bottle stop positioned to hold each bottle as it reaches said pick-up position, and helicoidal rings rigid on said wheel structure, one on each side of each bottle intended for a first row receptacle and each such ring extending in a smooth curve to the opposite sides of each bottle intended for an offset second row receptacle upon rotation of said wheel structure through said specifically spaced circumference, said helicoidal rings being so constructed and arranged that, upon rotation, they present alternately a bottle to a first row receptacle and a bottle to a second row receptacle on said transportation mechanism.

2. A uniform size bottle unscrambler and loader as defined in claim 1, wherein said series of a plurality of predetermined number of bottle receptacles having a selectived space betweem them on said transporting mechanism, and a second set of two bottle carrier recesses are provided on said wheel structure duly spaced circumferentially from said first set, and said helicoidal rings having smooth curves to move a bottle intended for the first row receptacle in said second set into the proper position during such duly spaced circumferential movement.

3. A uniform size bottle unscrambler and loader as defined in claim 1, including a bottle resting plate where a bottle carrier recess approaches a receptacle on said transporting mechanism, in position to release said bottle from said carrier recess.

4. A uniform size bottle unscrambler and loader as defined in claim 1, wherein said bottle lifting arm is pivotally mounted and has a spring urging said arm to lifting position, whereby said arm may move backward away from lifting position upon striking a fixed object.

5. A uniform size bottle unscrambler and loader as defined in claim 1, wherein said feeding table consists of a flat plate over which moves a continuous wire mesh belt, and a drive roll of radially extending wire bristles engages said belt in a direction to urge bottles on said table toward said receiving and transposing mechanism.

* * * * *